July 5, 1932.  L. DE MONTGRAND  1,865,559
MECHANICAL COUPLING
Filed Jan. 30, 1931

L. de Montgrand
INVENTOR

By: Marks & Clerk
ATTYS.

Patented July 5, 1932

1,865,559

UNITED STATES PATENT OFFICE

LÉON DE MONTGRAND, OF MARSEILLE, FRANCE

MECHANICAL COUPLING

Application filed January 30, 1931, Serial No. 512,462, and in France February 21, 1930.

The purpose of the present invention is to construct a coupling mechanism capable of automatically balancing at each instant a driving torque and its resisting torque by means of any mechanism based upon the new theorem, which is stated in what follows.

Figure 1:
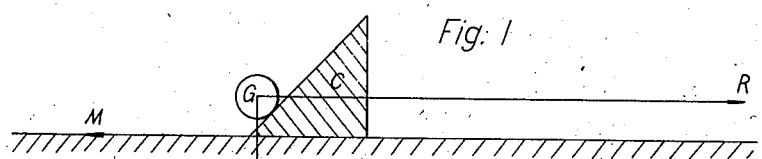

In order that this statement may be clearly understood reference is made to Fig. 1 of the accompanying drawing, which shows diagrammatically an elementary mechanism constituted by a cam C having the shape of an isosceles right-angled triangle of infinite dimensions and constrained to slide upon a horizontal plane without friction and parallel to itself on one of its equal sides acting as base and being acted upon at its lower acute angle by a driving force M also horizontal, which tends to draw it on the side opposite to the right-angle; and by a body G attached to a horizontal resistance R, located at infinity on the side opposite to the driving force M, said body being located on the slope of the cam and capable of sliding upon the hypothenuse of the right-angled triangle. The theorem to be considered can then be stated in the following way.

If a vertical force Po be applied to the body G from above downwards equal to the driving force, the driving work is always equal to the resisting work. If I be the distance passed through, this may be written $$MI = nR \frac{I}{n}.$$

If the slope of the inclined plane be decreased, the theorem remains true provided that the vertical force Po be multiplied by the ratio of the large to the small side of the right angle.

The accompanying drawing shows an example of construction of a balancing device the operation of which is based upon the preceding theorem and which serves to couple together a driving shaft and a driven shaft.

Figure 2:
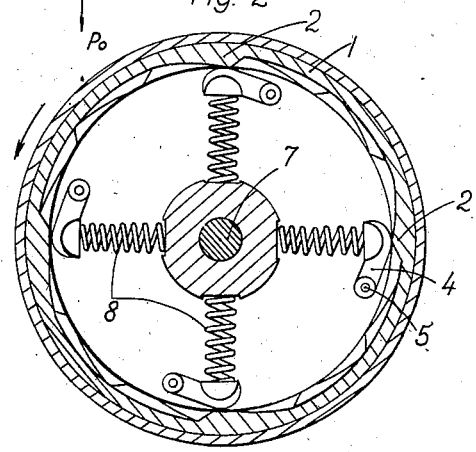
Figure 3:
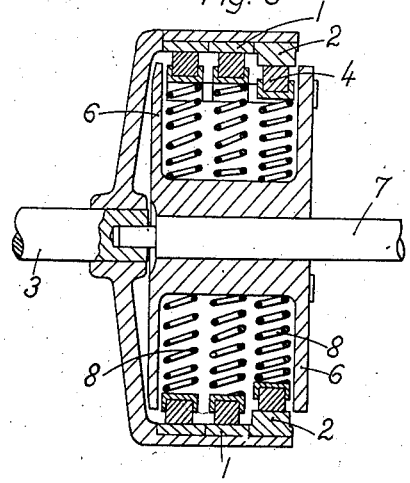

Fig. 2 is a cross section of the mechanism, which will be called balancer and Fig. 3 is an axial section.

In this mechanism the driving and the resisting forces become driving and resisting torques, since they are exerted upon a driving shaft and upon a driven shaft. The horizontal plane and the infinite cam are replaced by a wheel rim 1 with internal cams 2, keyed upon the driving shaft 3 and driven by it. The body G is replaced by shoes 4 pivoted at 5 upon a plate 6 keyed upon the driven shaft 7, which latter is in line with the driving shaft 3. The whole of the shoes are inside the cam rim and in the same plane.

An even number of cams arranged equidistant from each other are used. The shoes, which also are of even number, operate always at least two at a time and at the ends of one and the same diameter.

The cams and shoes are provided in such number that one pair of shoes reaches the end of the slopes of one pair of cams at the instant when another pair of shoes comes into contact with the slopes of another pair of cams, thus realizing practically the infinite cam of the theorem. For this purpose in the case in which a single cam rim would be insufficient, a sufficient number of cams may be provided by placing by the side of the original cam rim one or more other cam rims suitably staggered, wherein one or more other sets of shoes placed side by side operate as shown in the figures.

Finally the force Po is produced partly by springs 8 and partly by the centrifugal force to which the shoes are subjected.

The example given is applicable to a self-propelled vehicle. It is however to be clearly understood that the example described above has no limiting character and that modifications can be used provided that they are based upon the theorem described without exceeding the scope of the invention.

For example the two members of the coupling may be interchanged, that is to say, a small drum provided with cams may be keyed upon the driving shaft and rotate inside a rim provided with shoes attached to the driven shaft or the cams may be attached upon the back flat face, and not upon the rim, of a plate attached to the driving shaft, whilst the shoes would be pivoted upon another plate keyed upon the driven shaft.

In these mechanisms and in any other based upon the same theorem, the principle would remain the same.

The balancer may be employed as such, for example in a self-propelled vehicle, but may be also employed for different purposes, for example as speed reducing gear, as resilient drive and the like.

Whatever may be the construction adopted, the operation remains the same and may be described as follows.

1. If the driving torque and the resisting torque are equal the shoes maintain a fixed position upon their cams. The driven shaft rotates at the same speed as the driving shaft.

2. If the resisting torque be greater than the driving torque, there will be slipping of the shoes, which successively mount the cams in the rim, and thus the speed of the driven shaft will be decreased. In this case the torque transmitted to the driven shaft is equal to the driving torque multiplied by the ratio of driven torque to driving torque.

3. If the resisting torque be infinite, the driven shaft remains at rest. The whole of the driving torque is expended in causing the shoes to ride up on their cams and the torque transmitted by reaction to the driven shaft is enormous.

This mechanism therefore has nothing in common with a slipping clutch, it is indeed the reverse of such since in this latter the torque transmitted is equal to the driving torque less the quantity of energy lost by being converted into heat by friction in the clutch.

I claim:

A coupling mechanism for balancing automatically a driving torque and a resisting torque comprising a rotatable driving drum provided with interior cams of the same direction, a driven drum rotatable within the interior of the driving drum, centrifugally acting weighted shoes pivotally mounted on the driven drum for cooperating with the cams, and springs acting on said shoes, the weights of said shoes and the tension of said springs being so determined that the displacement of the driven drum is inversely proportional to the resisting torque for a same driving torque.

In testimony whereof he has signed this specification.

LÉON DE MONTGRAND.